United States Patent [19]
Behner

[11] Patent Number: 5,597,274
[45] Date of Patent: Jan. 28, 1997

[54] HOLE CUTTER

[76] Inventor: Ray E. Behner, 4801 Laurel Rd., Brunswick, Ohio 44212

[21] Appl. No.: 516,118

[22] Filed: Aug. 17, 1995

[51] Int. Cl.⁶ .................................................. B23B 51/04
[52] U.S. Cl. .......................................... 408/204; 408/703
[58] Field of Search ................................... 408/204–209, 408/703

[56] References Cited

U.S. PATENT DOCUMENTS

| | | | |
|---|---|---|---|
| 221,692 | 11/1879 | Miller | 408/204 |
| 2,179,029 | 11/1939 | Barnes | 408/206 |
| 3,387,637 | 11/1968 | Ferguson et al. | 408/204 |
| 3,610,768 | 10/1971 | Cochran | 408/204 |
| 5,074,722 | 12/1991 | Cochran | 408/204 |
| 5,433,560 | 7/1995 | Duncan | 408/206 |

FOREIGN PATENT DOCUMENTS

| | | | |
|---|---|---|---|
| 0039708 | 2/1988 | Japan | 408/204 |
| 404105811 | 4/1992 | Japan | 408/204 |

*Primary Examiner*—Steven C. Bishop
*Attorney, Agent, or Firm*—Ralph E. Jocke

[57] ABSTRACT

A hole cutter (10) suitable for quickly cutting relatively large holes through wood, fiberboard, drywall and similar non-metallic construction materials has a tubular member (16) attached to a back plate (14). The back plate includes attaching holes (22, 24) for attachment to a conventional hole saw arbor (12). The tubular member includes a gullet (28) which has a cutting bit (34) mounted adjacent thereto and facing in a direction of rotation. The cutting bit quickly cuts through wood and other materials. Chips generated during cutting are rapidly discharged away from the cutting edge (36) of the cutting bit and may pass through the gullet. Once the hole cutter has cut through, a core, which is cut out using the tool, is rapidly removed from the interior area (40). This is accomplished by using a screw driver or other tool extending through the gullet and prying out the core.

18 Claims, 3 Drawing Sheets

HOLE CUTTER

TECHNICAL FIELD

This invention relates to construction and plumbing tools. Specifically this invention relates to a hole cutter for use in cutting relatively large holes through wood and similar construction materials.

BACKGROUND ART

Hole saws for cutting through wood and other construction materials are known in the prior art. Hole saws typically consist of an annular saw member with a plurality of uniformly spaced teeth that extend in a ring about one end. At the opposed end is a disk or plate, often formed integrally with the annular wall which incorporates the teeth. The disk shaped end usually includes openings by which an arbor may be removably attached. The arbor includes a drive shaft which may be driven by an electric drill or similar motor.

During construction, particularly in home construction, it is often necessary to use hole saws which are two inches in diameter or larger. Usually holes are made to provide access for pipes to pass through wood sheets or framing. Drilling a large hole with a conventional hole saw can often require a great deal of time and effort, particularly when one is drilling through two or more inches of solid wood. The force required can burn out even a large electric drill motor. Wood materials of substantial age, as are encountered in remodeling activities, are even harder to cut through. Hole saws can also become dull rapidly and there is no convenient method for sharpening them.

Another common problem with conventional hole saws is that once the hole is drilled the round core of cut material is often stuck in the saw. Removing the core is necessary before the saw may be used again. Removing a core from a large hole saw can be exasperating and time consuming.

Thus there exists a need for a large hole cutter for use in cutting through wood and other similar construction materials that is faster, lasts longer and is easier to use.

DISCLOSURE OF INVENTION

It is an object the present invention to provide a hole cutter.

It is a further object of the present invention to provide a hole cutter for wood and other similar construction materials.

It is a further object of the present invention to provide a hole cutter that is suitable for making relatively large and deep holes.

It is a further object of the present invention to provide a hole cutter that requires less power to turn during cutting.

It is a further object of the present invention to provide a hole cutter that requires less force in the direction of cutting.

It is a further object of the present invention to provide a hole cutter that may be readily sharpened.

It is a further object of the present invention to provide a hole cutter from which the core of cut material may be readily removed.

Further objects of the present invention will be made apparent in the following Best Mode For Carrying Out Invention and the appended claims.

The foregoing objects are accomplished in a preferred form of the hole cutter of the present invention by a cutter having a tube shaped member. The tube shaped member has an annular shaped side wall that extends longitudinally. The tube shaped member has an outer diameter the size of the desired hole to be cut. The tubular member terminates at a first end in a radially extending, smooth face. Attached to the tubular member at an opposed end is a back plate which is a disk shaped member. The back plate has a central threaded hole and a pair of spaced lug pin holes suitable for attachment to a standard heavy duty hole saw arbor.

The annular wall of the tube member includes a large radially extending cut out or gullet. In the preferred form of the invention the gullet extends approximately three quarters of an inch about the circumference of the annular wall. The gullet also extends longitudinally in the tubular wall from the smooth face at the first end to adjacent the back plate at the second end.

Mounted to the tubular wall and bounding the gullet on a side facing the direction of rotation of the hole cutter during cutting, is a cutting bit. The cutting bit is angled toward the direction of cut. The cutting bit also extends angularly outward in the direction of cut. The cutting bit also extends longitudinally outward beyond the smooth face of the tubular wall. The cutting bit is sized to be generally slightly wider than the width of the tubular side wall.

During operation the hole cutter is rotated in a cutting rotational direction using a drill motor or similar device to turn the arbor attached to the back plate. The cutting bit of the hole cutter engages the wood, or similar material, and cuts it at a cutting edge on the bit. The chips produced at the cutting edge are discharged away from the area of the cut through the gullet. The smooth face of the tubular member rides with minimal friction in the ring like cut made by the cutting bit. As a result the hole cutter quickly cuts through several inches of wood or similar materials such as fiber board, plaster or the like.

When the cutting of the wood is complete, the core material is housed in the interior of the tubular member. The core is readily removed by using a screw driver or similar tool to engage the core through the gullet in prying it outward. The relatively large size of the gullet enables sufficient access to make core removal much easier than in conventional hole saws.

The single cutting bit of the hole cutter of the present invention is accessible and may be sharpened when required. Further because the chips are carried away from the cutting bit through the gullet, the build up of heat normally encountered in hole saws, is reduced. This further increases the life of the device and lengthens the time between required sharpening of the cutting bit.

BEST MODE FOR CARRYING OUT INVENTION

Figure 1:
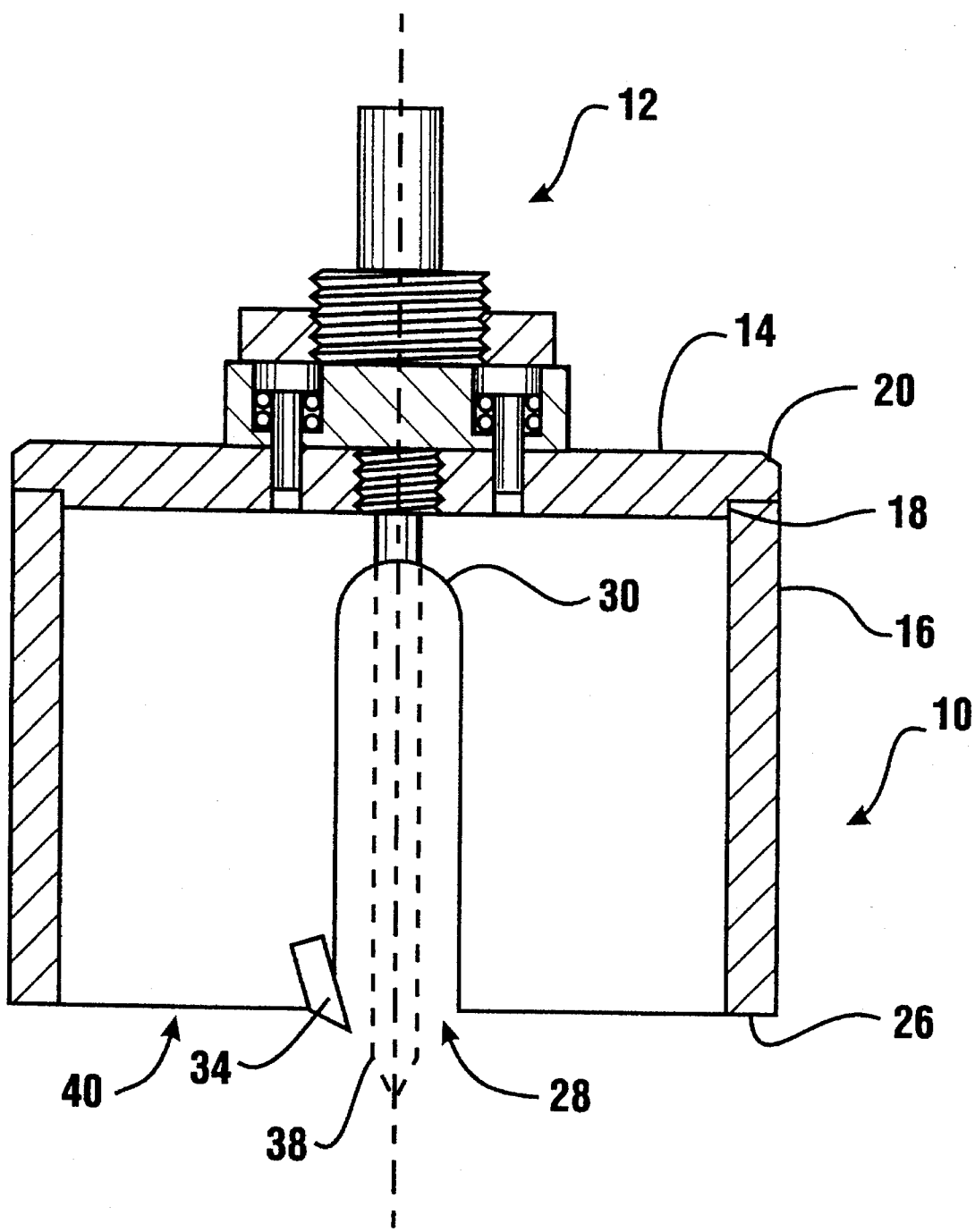
FIG. 1 is a cross sectional view of the hole cutter of the preferred embodiment of the present invention shown attached to a heavy duty hole saw arbor.

Referring now to the drawings and particularly to FIG. 1, there is shown therein the preferred embodiment of the hole cutter of the present invention generally indicated 10. The hole cutter is shown attached to a heavy duty hole saw arbor 12. Arbor 12 may be driven by an electric drill motor or similar device. The hole cutter shown in FIG. 1 is made to be turned in a clockwise direction when viewed from the top as shown by the direction of the arrow in FIG. 2.

Hole cutter 10 includes a back plate 14. An annular tubular member 16 is attached to back plate 14. Tubular member 16 nests in a recess formed by a shoulder 18 which extends about the periphery of back plate 14. In the preferred form of the invention, tubular member 16 is attached to back plate 14 by welding. Back plate 14 also includes a bevelled upper edge 20. Bevelled edge 20 is designed to avoid having a sharp surface at the top of the back plate. This minimizes the risk of a worker cutting themselves when using the hole cutter.

Figure 2:
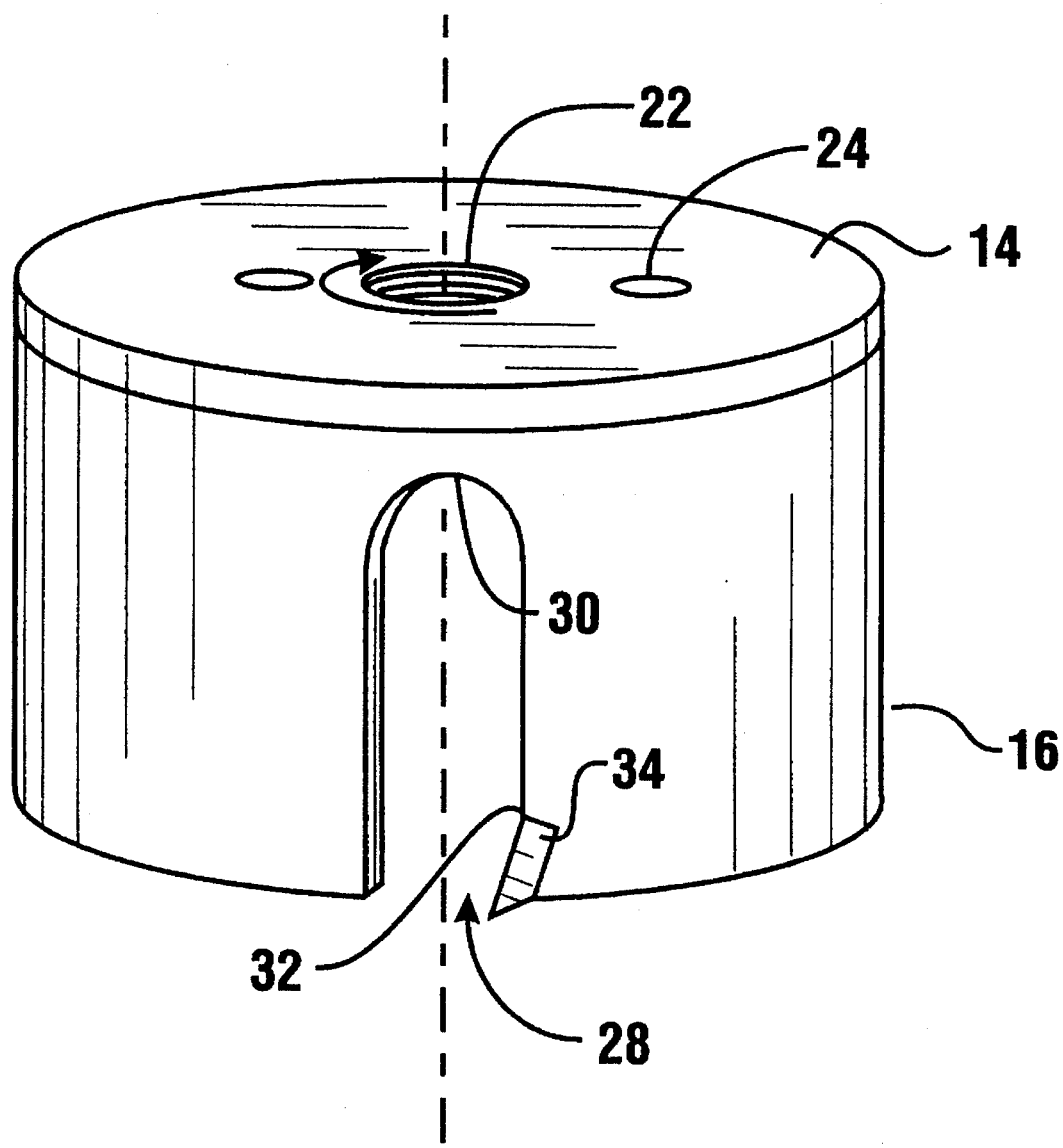
FIG. 2 is a side isometric view of the hole saw of the present invention.
Figure 3:
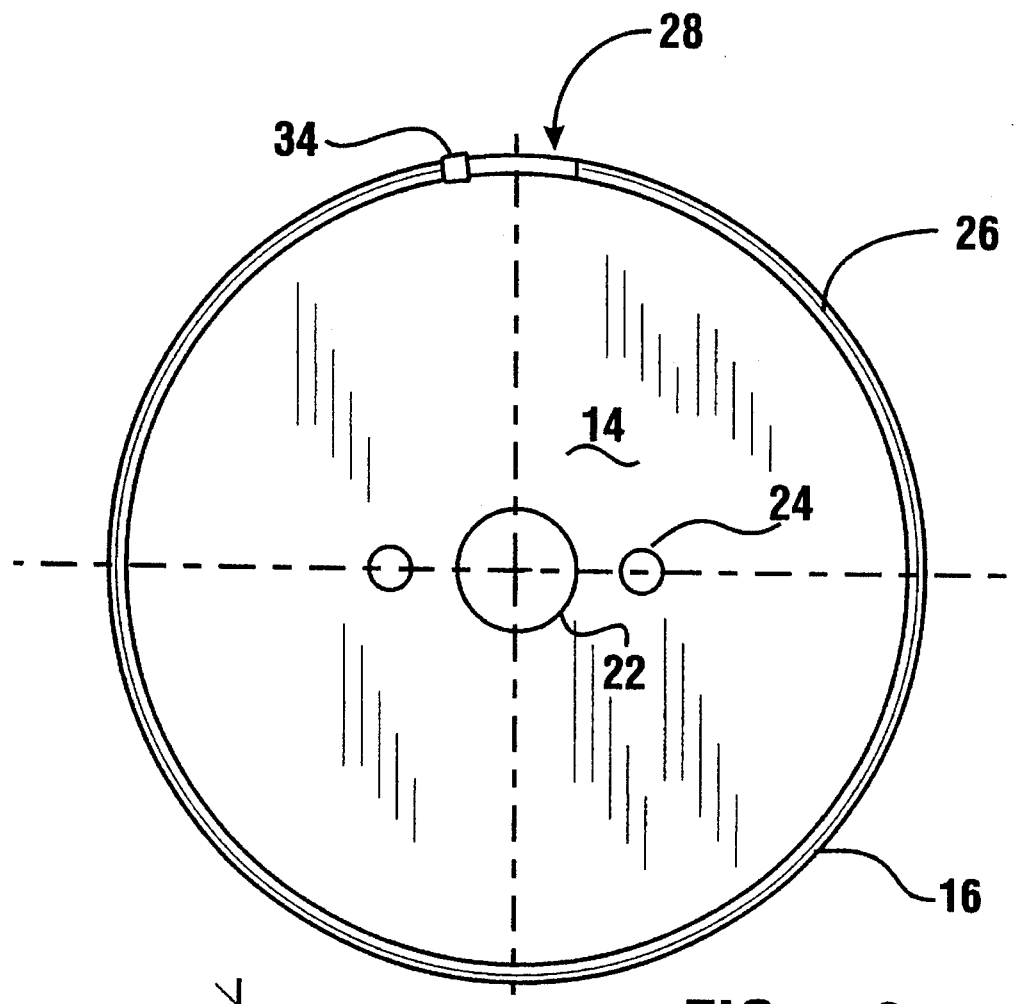
FIG. 3 is a bottom plan view of the hole cutter of the present invention.

As best shown in FIG. 2, back plate 14 includes a central hole 22 which is threaded to accept the central shaft of the arbor. Back plate 14 also includes two lug pin holes 24 which are sized to accept the lug pins of the arbor. In the preferred form of the invention, central hole 22 is a ⅝ inch threaded hole of the type conventionally used with heavy duty hole saw arbors. The back plate 14 is also generally ½ inch thick except at the area of the recess where the tubular member 16 is accepted.

At an opposed end from the back plate, tubular member 16 has a generally smooth radially extending face 26. Smooth face 26 extends generally the entire circumference of the tubular member 16 except where it is interrupted by a longitudinally extending cut out or gullet 28. Gullet 28 is relatively large and in one preferred form of the invention, which is a 4 inch diameter hole saw, extends generally about ¾ inch about the circumference. The gullet extends longitudinally in the side wall 16 to a rounded end 30 which extends to adjacent the back plate 14.

Figure 4:
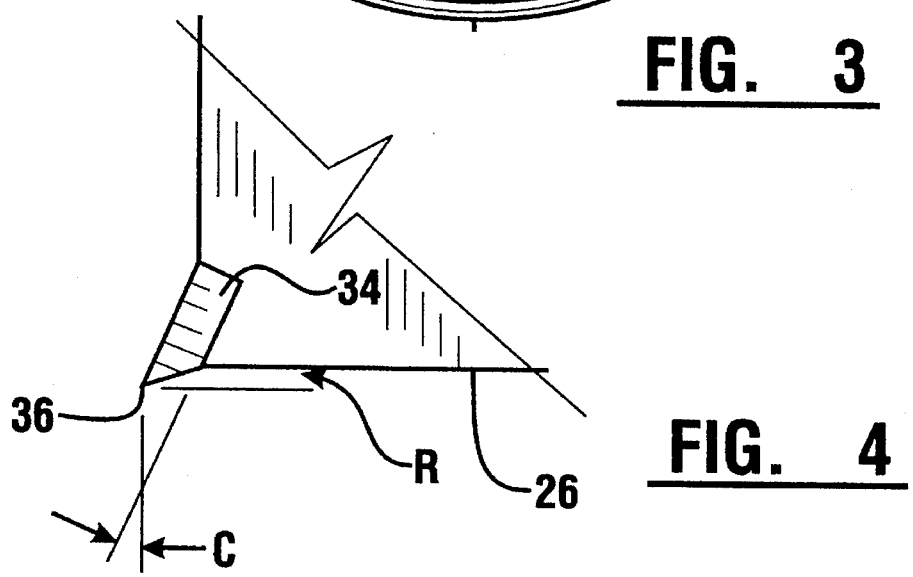
FIG. 4 is an enlarged side view of the cutting bit of the hole cutter.

Gullet 28 is bounded in a direction facing the direction of rotation by a gullet face 32. Extending as a smooth continuation with gullet face 32 is a cutting bit 34. Cutting bit 34 in the preferred embodiment is a generally square piece of high speed tool steel which is brazed into a recess cut in tubular wall 16. As best shown in FIG. 4, cutting bit 34 extends in the direction of rotation at an angle C. In the preferred form of the invention the cutting bit extends from an angle of 0° to 45° Preferably for cutting through wood or similar materials the cutting bit is generally angled at about 15°.

Cutting bit 34 terminates at a cutting edge 36. As best shown in FIG. 4 cutting edge 36 extends beyond smooth face 26 of the tubular member. In the preferred form of the invention, the cutting edge extends at least 0.005 inches below the smooth face, and preferably 0.015 to 0.020 inches below the smooth face in the form of the invention used for cutting wood and similar materials.

The cutting bit also has a relief that extends at an angle generally indicated R in FIG. 4. The angle of the relief is in a direction opposite to the direction of rotation. In the preferred form of the invention the relief angle is from 0° to 20° and in the preferred form of the invention for use in cutting wood is generally about 3°.

In the preferred form of the invention the tubular member 16 is preferably tubing comprised of cold rolled steel with a wall thickness of generally 0.10 inches. The cutting bit is preferably slightly wider, generally about 3⁄16 inches in width. This provides for the cutting surface to cut a path through the wood that is slightly larger than the width of the smooth face 26.

In addition, in the preferred form of the invention, the gullet serves to enable chips formed in the cutting process to move readily away from the cutting edge. The preferred form of the gullet in a 4 inch diameter hole saw is about ¾ of an inch or about 21° of the total circumference of the annular wall. A similar sized gullet is also suitable for use in a 2 inch diameter hole saw which is 43° of the total circle. In other embodiments, the gullet may be narrower or larger. The gullet size may be reduced to ½ inch or less in some embodiments. It may also be 5°, 10° or a larger angle suited to the particular size and speed of the hole cutter and the material which the hole cutter is designed to cut. Of course, as will be understood by those skilled in the art, a gullet that is too large in the angular direction can result in reduction of the stability provided by the smooth face riding in the cut. As a result, gullets that extend more than about 90° may result in a reduction of this desirable effect.

In the preferred form of the invention the hole cutter is designed for use with an electric drill that turns at generally 1,000 to 1,200 RPM under a no load condition. Again, in other embodiments other speeds may be appropriate without departing from the teachings of the present invention.

In operation, the hole saw of the present invention is turned in the direction of rotation generally indicated by the arrow in FIG. 2. The hole saw is started using a starter bit 38 shown in phantom in FIG. 1 which extends from the arbor. Bit 38 is a conventional drill bit which extends beyond the cutting bit 34 so as to aid in centering and stabilizing the hole cutter during the start of the cutting operation.

As the hole cutter begins to move into the wood or other material the cutting edge 36 on the cutting bit begins to slice into the wood creating an annular cut. The angle of the bit pulls the cutter into the wood. As the cutting bit cuts the wood, the chips that are generated fly away from the bit and through the gullet. This enables the chips to be quickly carried away as is the heat generated as the cutting bit cuts through the wood taking one slice on each rotation. The smooth face 26 rides in the annular cut being formed. The smooth annular face 26 riding in the annular cut produces only an insignificant amount of friction making the cutting process go quickly. The smooth annular face 26 also aids in stabilizing the hole cutter enabling most cutting to be accomplished without significant vibration or chatter.

The annular tubular wall 16 is of sufficient depth to enable the cutter to cut through a significant thickness of wood. Optimally the cutter should be deep enough to cut through a 2¼ inch thick wood piece. For example, the cutter may commonly be used to cut through a 2 inch by 10 inch floor joist and ¾ inches of plywood that may be attached thereto.

Once the cutter has been used to cut through the materials, the core is located in the interior area generally indicated 40 bounded by the wall of the tubular member 16. Because the gullet 28 extends longitudinally in tubular member 16 to adjacent back plate 14 the core may be readily removed. This is done by inserting a screw driver or similar item through the gullet 28 to engage the core. The core may then be pried outwardly so as to be readily removed from the interior area. The present invention enables the quick removal of the core and minimizes the problem of cores becoming stuck in the hole saw which often consumes considerable time to correct and delays the worker in making the next hole.

The preferred form of the hole cutter of the present invention is optimally used in plumbing and construction activities to provide access for plumbing or heating pipes and duct work. The preferred form of the cutter shown herein is ideally used for cutting through wood, fiber board and other non-metallic construction materials. The form of the invention shown is also much faster in cutting through such materials than similarly sized conventional hole saws. Because chips are carried away from the cutting bit the hole cutter runs cooler than conventional hole saws. This prolongs the life of the cutting bit. In addition, because the bit is accessible it may be readily sharpened if it becomes dull through repeated use.

Thus the new hole cutter of the present invention achieves the above stated objectives, eliminates difficulties encountered in the use of prior devices and systems, solves problems and attains the desirable results described herein.

In the foregoing description, certain terms have been used for brevity, clarity and understanding. However, no unnecessary limitations are to be implied therefrom because such terms are for descriptive purposes and are intended to be broadly construed. Moreover, the descriptions and illustrations are by way of examples and the invention is not limited to the details shown and described.

Further, in the following claims any feature described as a means for performing a recited function shall be construed as encompassing any means capable of performing the recited function and is not limited to the particular means described herein or mere equivalents.

Having described the features, discoveries and principles of the invention, the manner in which it is constructed and operated and the advantages and useful results attained; the new and useful structures, devices, elements, arrangements, parts, combinations, systems, equipment, operations and relationships are set forth in the appended claims.

I claim:

1. A hole cutter for cutting a hole through a workpiece comprising:

a drill bit portion extending in a longitudinal direction;

a tube member having an annular side wall concentric with said bit portion and extending in the longitudinal direction, said side wall terminating in a generally smooth planar radially extending face;

no more than one gullet extending radially through said smooth face and longitudinally in said side wall; and a cutting bit fixably mounted to said side wall, said cutting bit mounted adjacent to said gullet, said cutting bit extending longitudinally outward from said smooth face.

2. The hole cutter according to claim 1 wherein said tube member is bounded by a back plate at an opposed longitudinal end from said smooth face, and wherein said gullet extends longitudinally in said side wall to adjacent said back plate.

3. The hole cutter according to claim 1 wherein said tube member is bounded by a back plate at an end opposed of said smooth face, and wherein said back plate includes at least one mounting hole, whereby an arbor may be attached to said hole cutter.

4. The hole cutter according to claim 1 wherein said tube member is bounded by a back plate at an end opposed of said smooth face, and wherein said back plate comprises an annular recess, and wherein said tube member extends in said recess.

5. The hole cutter according to claim 1 wherein said cutter is rotatable in a direction of rotation, and wherein said cutting bit extends at an angle longitudinally and in said direction of rotation.

6. The hole cutter according to claim 5 wherein said angle of said cutting bit is generally in a range from 0°–45°.

7. The hole cutter according to claim 1 wherein said cutting bit in a radially direction has a width at least as great as a width of said smooth face.

8. The hole cutter according to claim 7 wherein said width of said gullet in said side wall is at least 0.50 inches and said tube member has a diameter of at least 2 inches.

9. The hole cutter according to claim 1 wherein said hole cutter is rotatable in a direction of rotation and wherein said cutting bit has an angled relief from said cutting edge in a direction opposed of said rotational direction.

10. The hole cutter according to claim 1 wherein said gullet extends at least ½ inch about said circumference.

11. The hole cutter according to claim 10 wherein said cutting bit extends in the longitudinal direction beyond said radially extending face at least 0.005 inches.

12. The hole cutter according to claim 1 wherein said cutter is rotatable in a rotational direction and wherein said gullet is bounded by a gullet face, and wherein said cutting bit is mounted adjacent a portion of said gullet face, and wherein said portion faces in said rotational direction.

13. A hole cutter for cutting a hole through a workpiece, comprising:

a drill bit portion extending in a longitudinal direction;

a tubular member rotatable in a rotational direction, said member having a longitudinally extending annular side wall concentric with said drill bit portion, said side wall terminating at a first longitudinal end at a generally planar, smooth radially extending face surface;

no more than one gullet extending through said face surface and extending longitudinally in said side wall, said gullet being bounded by a cutting edge on a side facing said rotational direction.

14. The hole cutter according to claim 13 wherein said gullet extends from about 5° to 90° of said circumference.

15. The hole cutter according to claim 13 wherein said gullet extends from about 10° to 90° of said circumference.

16. The hole cutter according to claim 13 wherein said face surface is generally planar and extends in a radial direction.

17. The hole cutter according to claim 13 wherein said gullet is bounded by a cutting surface and wherein said cutting surface is angled in a direction toward the rotational direction with increasing proximity to said cutting edge.

18. A hole cutter for cutting through a workpiece, comprising:

drill bit means including a free end for drilling a relatively small centering hole, wherein said drill bit means extends along a longitudinal axis;

a member means in operative connection with said drill bit means and wherein said member means extends in surrounding coaxial relation with said drill bit means, and wherein said member means has in supported connection therewith no more than one cutting edge, said cutting edge being disposed radially outward from said drill bit means and in a first longitudinal direction from said free end, and wherein said member means includes in supported relation therewith a generally smooth, radially extending generally annular surface, wherein said annular surface is disposed from said free end in said first longitudinal direction slightly further than said cutting edge, whereby upon rotational engagement of said apparatus with a workpiece said annular surface smoothly rides in a swath cut by said cutting edge cutting through the workpiece to form a hole therethrough.

* * * * *